United States Patent
Suyama et al.

(10) Patent No.: US 12,424,858 B2
(45) Date of Patent: Sep. 23, 2025

(54) BATTERY PACK, AND ABNORMALITY MONITORING METHOD FOR SAME

(71) Applicant: SANYO Electric Co., Ltd., Daito (JP)

(72) Inventors: Atsushi Suyama, Osaka (JP); Junpei Ito, Tokyo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 537 days.

(21) Appl. No.: 17/619,647

(22) PCT Filed: Jun. 11, 2020

(86) PCT No.: PCT/JP2020/022937
§ 371 (c)(1),
(2) Date: Dec. 16, 2021

(87) PCT Pub. No.: WO2020/262002
PCT Pub. Date: Dec. 30, 2020

(65) Prior Publication Data
US 2022/0352729 A1   Nov. 3, 2022

(30) Foreign Application Priority Data
Jun. 27, 2019 (JP) .................. 2019-119647

(51) Int. Cl.
*H02J 7/00* (2006.01)
*H01M 10/42* (2006.01)
(Continued)

(52) U.S. Cl.
CPC ......... *H02J 7/0029* (2013.01); *H01M 10/425* (2013.01); *H01M 10/44* (2013.01);
(Continued)

(58) Field of Classification Search
CPC ...... H02J 7/0029; H02J 7/0013; H02J 7/0047; H02J 7/007; H02J 7/342; H02J 7/0031;
(Continued)

(56) References Cited

U.S. PATENT DOCUMENTS 4,792,743 A * 12/1988 Tsujino ............... H02J 7/00714
320/DIG. 19
5,493,197 A * 2/1996 Eguchi .................. H02J 7/0031
320/134
(Continued)

FOREIGN PATENT DOCUMENTS

CN   102280669 A   12/2011
CN   105009401 A * 10/2015 ............ H01M 10/42
(Continued)

OTHER PUBLICATIONS

JP2015109741_Machine_Translation (Year: 2015).*
(Continued)

*Primary Examiner* — John T Trischler
(74) *Attorney, Agent, or Firm* — WHDA, LLP (57) ABSTRACT

A battery pack includes a current detector configured to detect a charging current to secondary battery, a drive circuit configured to drives a charge switch based on the charging current detected by the current detector, a charge controller configured to control operation of the charge switch by the drive circuit, a monitoring unit configured to monitor operation of charge controller, and a judging unit configured to instruct, based on the charge controller and the monitoring unit, the charge switch to be able to or unable to operate.

11 Claims, 3 Drawing Sheets

(51) Int. Cl.
  *H01M 10/44*      (2006.01)
  *H01M 10/48*      (2006.01)
  *H02J 7/34*       (2006.01)
  *G06F 11/07*          (2006.01)
  *G06F 11/14*          (2006.01)
  *G06F 11/16*          (2006.01)

(52) U.S. Cl.
  CPC ......... *H01M 10/486* (2013.01); *H02J 7/0013* (2013.01); *H02J 7/0031* (2013.01); *H02J 7/0047* (2013.01); *H02J 7/007* (2013.01); *H02J 7/342* (2020.01); *G06F 11/0721* (2013.01); *G06F 11/0736* (2013.01); *G06F 11/0742* (2013.01); *G06F 11/1479* (2013.01); *G06F 11/1629* (2013.01); *G06F 11/1637* (2013.01)

(58) Field of Classification Search
  CPC ... Y02E 60/10; H01M 10/425; H01M 10/486; H01M 10/44
  USPC .............................................................. 320/103
  See application file for complete search history.

(56) References Cited

U.S. PATENT DOCUMENTS

| | | | | |
|---|---|---|---|---|
| 5,594,646 A * | 1/1997 | Itoh | G06F 11/0736 | 73/114.61 |
| 5,811,890 A * | 9/1998 | Hamamoto | H02J 9/061 | 307/66 |
| 5,818,201 A * | 10/1998 | Stockstad | H02J 7/00308 | 320/118 |
| 5,825,155 A * | 10/1998 | Ito | H02J 7/0013 | 429/149 |
| 5,831,350 A * | 11/1998 | McConkey | G06F 1/263 | 320/128 |
| 5,835,989 A * | 11/1998 | Nagai | H02J 7/0031 | 320/112 |
| 5,896,025 A * | 4/1999 | Yamaguchi | H02J 7/0031 | 320/136 |
| 5,903,131 A * | 5/1999 | Sekine | H02J 7/00047 | 320/112 |
| 6,060,863 A * | 5/2000 | Sakurai | H02J 7/0031 | 320/136 |
| 6,060,864 A * | 5/2000 | Ito | G01R 31/396 | 320/136 |
| 6,064,179 A * | 5/2000 | Ito | H02J 7/0063 | 320/128 |
| 6,208,117 B1 * | 3/2001 | Hibi | H02J 7/0014 | 320/136 |
| 6,380,763 B1 * | 4/2002 | Ando | H02J 7/0031 | 326/83 |
| 6,492,791 B1 * | 12/2002 | Saeki | H01M 10/425 | 320/135 |
| 6,822,424 B2 * | 11/2004 | Odaohhara | G06F 11/0721 | 714/E11.138 |
| 6,883,123 B2 * | 4/2005 | Hashimoto | G06F 11/079 | 714/41 |
| 6,885,168 B2 * | 4/2005 | Okumura | H02J 7/00302 | 320/135 |
| 6,965,216 B2 * | 11/2005 | Pavlovic | H02J 7/0069 | 320/157 |
| 6,989,652 B2 * | 1/2006 | Saeki | H02J 7/0014 | 320/134 |
| 6,992,463 B2 * | 1/2006 | Yoshio | H02H 3/05 | |
| 7,276,881 B2 * | 10/2007 | Okumura | H02J 7/00306 | 320/135 |
| 7,383,452 B2 * | 6/2008 | Veselic | G06F 1/266 | 710/72 |
| 7,423,410 B2 * | 9/2008 | Yoshio | H02J 7/007182 | 320/136 |
| 7,495,416 B2 * | 2/2009 | Sato | H02J 7/342 | 320/136 |
| 7,508,171 B2 * | 3/2009 | Carrier | H02J 7/00304 | 320/135 |
| 7,521,892 B2 * | 4/2009 | Funabashi | H01M 50/296 | 320/114 |
| 7,557,585 B2 * | 7/2009 | Yudahira | G01R 31/389 | 320/132 |
| 7,579,811 B2 * | 8/2009 | Sato | H02J 7/0031 | 320/132 |
| 7,598,701 B2 * | 10/2009 | Odaohhara | H02J 7/0031 | 320/134 |
| 7,602,146 B2 * | 10/2009 | Carrier | H01M 10/486 | 320/120 |
| 7,855,531 B2 * | 12/2010 | Zhang | H01M 10/44 | 320/135 |
| 8,049,469 B2 * | 11/2011 | Kim | H02J 7/00309 | 320/155 |
| 8,210,273 B2 * | 7/2012 | Suzuki | H01M 10/4207 | 173/217 |
| 8,305,041 B2 * | 11/2012 | Takeda | H01M 10/486 | 320/134 |
| 8,330,426 B2 * | 12/2012 | Suzuki | H01M 10/4257 | 362/183 |
| 8,384,349 B2 * | 2/2013 | Suzuki | B25F 5/00 | 173/214 |
| 8,384,355 B2 * | 2/2013 | Koike | H02J 7/0031 | 320/132 |
| 8,405,359 B2 * | 3/2013 | Tange | H02J 7/00302 | 320/135 |
| 8,450,975 B2 * | 5/2013 | Kim | H01M 10/488 | 320/136 |
| 8,558,509 B2 * | 10/2013 | He | H02J 7/0031 | 320/134 |
| 8,558,513 B2 * | 10/2013 | Kim | H02J 7/00309 | 320/155 |
| 8,618,774 B2 * | 12/2013 | Maetani | H02J 7/0047 | 320/134 |
| 8,742,724 B2 * | 6/2014 | Suzuki | B25F 5/00 | 320/132 |
| 8,766,599 B2 * | 7/2014 | Kim | H02J 7/0068 | 320/136 |
| 8,802,257 B2 * | 8/2014 | Kim | H01M 10/441 | 429/61 |
| 8,859,124 B2 * | 10/2014 | Tanno | H02J 7/00302 | 429/93 |
| 8,865,328 B2 * | 10/2014 | Kim | H01M 10/425 | 320/135 |
| 8,890,481 B2 * | 11/2014 | Mori | G05B 19/058 | 320/134 |
| 8,909,997 B2 * | 12/2014 | Fuchigami | G06F 11/079 | 714/55 |
| 9,018,915 B2 * | 4/2015 | Nam | H02J 7/0031 | 320/135 |
| 9,166,399 B2 * | 10/2015 | Lei | H02J 7/00302 | |
| 9,176,561 B2 * | 11/2015 | Lee | G06F 8/65 | |
| 9,298,530 B2 * | 3/2016 | Fuchigami | G06F 11/079 | |
| 9,331,497 B2 * | 5/2016 | Beaston | H02J 7/00 | |
| 9,438,050 B2 * | 9/2016 | Takeda | H02J 7/0031 | |
| 9,647,479 B2 * | 5/2017 | Mori | H02J 7/0049 | |
| 9,780,592 B2 * | 10/2017 | Abiru | H02J 7/0049 | |
| 9,798,609 B2 * | 10/2017 | Kwon | G06F 11/0751 | |
| 9,893,343 B2 * | 2/2018 | Takano | H01M 10/48 | |
| 10,003,205 B2 * | 6/2018 | Kaji | H02J 7/00306 | |
| 10,074,875 B2 * | 9/2018 | Shibata | H02J 7/007194 | |
| 10,116,148 B2 * | 10/2018 | Kubota | H02J 7/0031 | |
| 10,141,551 B2 * | 11/2018 | Choi | H02J 7/00306 | |
| 10,199,844 B2 * | 2/2019 | Horie | H02J 7/00 | |
| 10,355,499 B2 * | 7/2019 | Takeda | H02J 7/0031 | |
| 10,483,753 B2 * | 11/2019 | Peng | G06F 1/263 | |
| 10,516,276 B2 * | 12/2019 | Yamauchi | H02J 7/00304 | |
| 10,528,110 B2 * | 1/2020 | Jäntti | G06F 11/0778 | |
| 10,572,325 B2 * | 2/2020 | Yamazoe | B60L 58/21 | |
| 10,711,757 B2 * | 7/2020 | Kim | H01M 10/425 | |
| 10,916,959 B2 * | 2/2021 | Kawano | H02J 7/007182 | |
| 11,010,225 B2 * | 5/2021 | Marui | G06F 11/0772 | |
| 11,018,515 B2 * | 5/2021 | Yamaguchi | H02J 7/0025 | |

(56) References Cited

U.S. PATENT DOCUMENTS

| | | | | |
|---|---|---|---|---|
| 11,128,158 B2* | 9/2021 | Mulawski | | H02J 7/0047 |
| 11,150,711 B2* | 10/2021 | Chavali | | G06F 1/266 |
| 11,165,261 B2* | 11/2021 | Motoichi | | H02J 7/00306 |
| 11,218,015 B2* | 1/2022 | Suzuki | | H02J 7/00306 |
| 11,255,287 B2* | 2/2022 | Taylor | | F02D 41/266 |
| 11,264,792 B2* | 3/2022 | Takeda | | H01M 50/574 |
| 11,340,285 B2* | 5/2022 | Yoon | | G01R 31/2837 |
| 11,462,921 B2* | 10/2022 | Yamaguchi | | H02H 7/18 |
| 11,567,549 B2* | 1/2023 | Ravinuthula | | H01M 10/4285 |
| 11,646,569 B2* | 5/2023 | Takeda | | H02H 7/18 |
| | | | | 320/108 |
| 11,803,435 B2* | 10/2023 | Park | | G06F 11/076 |
| 12,007,820 B2* | 6/2024 | Ivanchenko | | G06F 1/30 |
| 12,062,931 B2* | 8/2024 | Suzuki | | H02J 7/00302 |
| 2002/0089318 A1* | 7/2002 | Armstrong, II | | G05F 1/56 |
| | | | | 323/285 |
| 2002/0190694 A1* | 12/2002 | Saeki | | H02J 7/0014 |
| | | | | 320/135 |
| 2003/0030413 A1* | 2/2003 | Saeki | | H02J 7/00302 |
| | | | | 320/136 |
| 2003/0079163 A1* | 4/2003 | Hashimoto | | G06F 11/079 |
| | | | | 714/55 |
| 2003/0094927 A1* | 5/2003 | Pavlovic | | H02J 7/0069 |
| | | | | 320/162 |
| 2003/0096158 A1* | 5/2003 | Takano | | H02J 7/0031 |
| | | | | 429/61 |
| 2003/0115001 A1* | 6/2003 | Odaohhara | | G06F 11/0793 |
| | | | | 714/E11.138 |
| 2005/0077878 A1* | 4/2005 | Carrier | | B60L 53/18 |
| | | | | 320/134 |
| 2005/0127879 A1* | 6/2005 | Sato | | H02J 7/007182 |
| | | | | 320/134 |
| 2005/0134230 A1* | 6/2005 | Sato | | H01M 10/486 |
| | | | | 320/136 |
| 2005/0242779 A1* | 11/2005 | Yoshio | | H02H 3/044 |
| | | | | 320/134 |
| 2006/0001403 A1* | 1/2006 | Yudahira | | G01R 19/16542 |
| | | | | 320/134 |
| 2006/0049804 A1* | 3/2006 | Saeki | | H01M 10/425 |
| | | | | 320/136 |
| 2006/0220605 A1* | 10/2006 | Funabashi | | H01M 10/42 |
| | | | | 318/434 |
| 2006/0230293 A1* | 10/2006 | Veselic | | G06F 1/24 |
| | | | | 713/300 |
| 2006/0255768 A1* | 11/2006 | Yoshio | | H02J 7/007182 |
| | | | | 320/134 |
| 2007/0096695 A1* | 5/2007 | Kimura | | H02J 7/0031 |
| | | | | 320/134 |
| 2007/0194751 A1* | 8/2007 | Odaohhara | | H02J 7/0031 |
| | | | | 320/112 |
| 2008/0048620 A1* | 2/2008 | Zhang | | H02J 7/0031 |
| | | | | 320/134 |
| 2008/0180059 A1* | 7/2008 | Carrier | | H02J 7/00304 |
| | | | | 320/112 |
| 2009/0085521 A1* | 4/2009 | Kim | | H02J 7/0031 |
| | | | | 361/101 |
| 2009/0108808 A1* | 4/2009 | He | | H02J 7/0031 |
| | | | | 320/134 |
| 2009/0146614 A1* | 6/2009 | Carrier | | H01M 50/583 |
| | | | | 320/152 |
| 2009/0160405 A1* | 6/2009 | Takeda | | H02J 7/0031 |
| | | | | 320/152 |
| 2009/0256521 A1* | 10/2009 | Mori | | H02J 7/0049 |
| | | | | 320/108 |
| 2010/0060084 A1* | 3/2010 | Tange | | H01M 10/441 |
| | | | | 307/130 |
| 2010/0084150 A1* | 4/2010 | Suzuki | | H01M 50/543 |
| | | | | 173/217 |
| 2010/0085008 A1* | 4/2010 | Suzuki | | H01M 10/482 |
| | | | | 324/426 |
| 2010/0085010 A1* | 4/2010 | Suzuki | | B25F 5/00 |
| | | | | 320/132 |
| 2010/0085020 A1* | 4/2010 | Suzuki | | B25F 5/00 |
| | | | | 320/157 |
| 2010/0129700 A1* | 5/2010 | Tanno | | H01M 10/441 |
| | | | | 429/93 |
| 2011/0050176 A1* | 3/2011 | Koike | | H02J 7/0031 |
| | | | | 320/134 |
| 2011/0057622 A1* | 3/2011 | Kim | | H01M 10/482 |
| | | | | 429/61 |
| 2011/0104525 A1* | 5/2011 | Kim | | H01M 10/441 |
| | | | | 429/61 |
| 2011/0140670 A1* | 6/2011 | Maetani | | H02J 7/0031 |
| | | | | 320/134 |
| 2011/0305926 A1 | 12/2011 | Kim et al. | | |
| 2012/0008246 A1* | 1/2012 | Kim | | H02J 7/00309 |
| | | | | 361/104 |
| 2012/0011407 A1* | 1/2012 | Fuchigami | | G06F 11/079 |
| | | | | 714/39 |
| 2012/0056587 A1* | 3/2012 | Iida | | H01M 10/443 |
| | | | | 320/134 |
| 2012/0280661 A1* | 11/2012 | Nam | | H02J 7/0031 |
| | | | | 320/136 |
| 2012/0297211 A1* | 11/2012 | Lee | | G06F 8/65 |
| | | | | 713/310 |
| 2012/0299545 A1* | 11/2012 | Kuraishi | | H02J 9/005 |
| | | | | 320/112 |
| 2013/0026997 A1* | 1/2013 | Takeda | | H01M 10/46 |
| | | | | 320/134 |
| 2013/0098646 A1* | 4/2013 | Funabashi | | H01M 10/4207 |
| | | | | 429/61 |
| 2013/0099755 A1* | 4/2013 | Lei | | H02J 7/0031 |
| | | | | 320/137 |
| 2013/0257385 A1* | 10/2013 | Kim | | H01M 10/486 |
| | | | | 320/134 |
| 2013/0328530 A1* | 12/2013 | Beaston | | H02J 7/0019 |
| | | | | 320/128 |
| 2015/0035488 A1 | 2/2015 | Mori et al. | | |
| 2015/0052407 A1* | 2/2015 | Fuchigami | | G06F 11/079 |
| | | | | 714/55 |
| 2015/0145484 A1* | 5/2015 | Shibata | | H01M 10/4257 |
| | | | | 320/134 |
| 2015/0340894 A1* | 11/2015 | Horie | | H02J 7/00302 |
| | | | | 320/107 |
| 2016/0049636 A1* | 2/2016 | Takano | | H01M 10/48 |
| | | | | 429/61 |
| 2016/0110242 A1* | 4/2016 | Kwon | | H02J 7/0013 |
| | | | | 714/37 |
| 2016/0118821 A1* | 4/2016 | Takeda | | H02J 7/0031 |
| | | | | 320/134 |
| 2016/0197506 A1* | 7/2016 | Abiru | | H01M 10/46 |
| | | | | 320/134 |
| 2016/0201634 A1* | 7/2016 | Kim | | B60L 50/64 |
| | | | | 320/136 |
| 2017/0033575 A1* | 2/2017 | Kaji | | H02J 7/00306 |
| 2017/0033585 A1* | 2/2017 | Niki | | H02J 7/00306 |
| 2017/0054303 A1* | 2/2017 | Choi | | H02J 7/007182 |
| 2017/0098943 A1* | 4/2017 | Kubota | | H02J 7/0068 |
| 2017/0168537 A1* | 6/2017 | Jäntti | | G06F 11/0778 |
| 2017/0264123 A1* | 9/2017 | Mulawski | | H02J 7/0014 |
| 2017/0351561 A1* | 12/2017 | Yamazoe | | G06F 11/0745 |
| 2018/0026438 A1* | 1/2018 | Peng | | G06F 1/30 |
| | | | | 361/86 |
| 2018/0183247 A1* | 6/2018 | Yamauchi | | H02J 7/0031 |
| 2018/0328301 A1* | 11/2018 | Taylor | | F02D 41/266 |
| 2019/0020074 A1* | 1/2019 | Motoichi | | H02J 7/00304 |
| 2019/0199103 A1* | 6/2019 | Kawano | | H02J 7/007182 |
| 2019/0280341 A1* | 9/2019 | Li | | H02H 3/05 |
| 2019/0294488 A1* | 9/2019 | Marui | | F02D 41/266 |
| 2019/0391627 A1* | 12/2019 | Chavali | | G06F 13/4282 |
| 2020/0091757 A1* | 3/2020 | Suzuki | | H02J 7/00304 |
| 2020/0185937 A1* | 6/2020 | Yamaguchi | | H02H 7/18 |
| 2020/0381917 A1* | 12/2020 | Takeda | | H01M 10/44 |
| 2020/0381926 A1* | 12/2020 | Ravinuthula | | G01R 31/396 |
| 2020/0408831 A1* | 12/2020 | Yoon | | G06F 11/0757 |
| 2021/0273463 A1* | 9/2021 | Yamaguchi | | H02H 7/18 |
| 2021/0376624 A1* | 12/2021 | Kono | | H02J 7/0063 |
| 2021/0382536 A1* | 12/2021 | Ivanchenko | | G06F 11/3058 |
| 2022/0066855 A1* | 3/2022 | Park | | G06F 11/076 |

(56) References Cited

U.S. PATENT DOCUMENTS

| | | | |
|---|---|---|---|
| 2022/0094180 A1* | 3/2022 | Suzuki | H02J 7/00302 |
| 2022/0140596 A1* | 5/2022 | Takeda | H02J 7/0031 |
| | | | 320/134 |
| 2023/0176538 A1* | 6/2023 | Dickey | H02J 1/108 |
| | | | 326/37 |
| 2023/0352947 A1* | 11/2023 | Chen | B60L 53/51 |
| 2024/0106249 A1* | 3/2024 | Suyama | H02H 7/18 |
| 2024/0136808 A1* | 4/2024 | Taniguchi | H02H 3/085 |
| 2024/0235182 A9* | 7/2024 | Taniguchi | H01H 37/761 |

FOREIGN PATENT DOCUMENTS

| | | | | |
|---|---|---|---|---|
| EP | 1533881 A2 | | 5/2005 | |
| EP | 2317598 A1 * | | 5/2011 | ........ H01M 10/425 |
| EP | 2400628 A2 * | | 12/2011 | ........ H01M 10/425 |
| JP | 7-141066 A | | 6/1995 | |
| JP | 2005012852 A * | | 1/2005 | |
| JP | 2009-261092 A | | 11/2009 | |
| JP | 2012-227986 A | | 11/2012 | |
| JP | 5284672 B2 | | 9/2013 | |
| JP | 2015109741 A * | | 6/2015 | |
| JP | 2015128361 A * | | 7/2015 | |
| JP | 2018-046597 A | | 3/2018 | |
| JP | 2018093694 A * | | 6/2018 | |
| WO | WO-2016072002 A1 * | | 5/2016 | ........ B60L 3/0046 |

OTHER PUBLICATIONS

"Preference of NAND & NOR gates," User3624, Stack Exchange, p. 3. https://electronics.stackexchange.com/questions/72806/preference-of-nand-nor-gates (Year: 2013).*

International Search Report dated Sep. 1, 2020, issued in counterpart International Application No. PCT/JP2020/022937 (2 pages).

The Extended European Search Report dated Jul. 29, 2022, issued in counterpart EP Application No. 20830674.6. (9 pages).

English Translation of Chinese Office Action dated Sep. 7, 2024, issued in counterpart CN application No. 202080038315.9. (4 pages).

English translation of Office Action dated Apr. 16, 2025, issued in counterpart CN Application No. 202080038315.9. (4 pages).

* cited by examiner

| Charge Signal | Reset Signal | Determination Signal | Charge FET |
|---|---|---|---|
| H | H | L | ON |
| H | L | H | OFF |
| L | H | H | OFF |
| L | L | H | OFF |

BATTERY PACK, AND ABNORMALITY MONITORING METHOD FOR SAME

TECHNICAL FIELD

The present invention relates to a battery pack, and an abnormality monitoring method for the battery pack.

BACKGROUND ART

A secondary battery is utilized as a power source for devices driven by a battery, such as mobile devices, assisted bicycles, electric tools, electric cleaners, and electric scooters. Such a secondary battery is charged by a battery pack such As a charger. In the battery pack, charge/discharge control device including a microcomputer called a battery management system is widely used. The battery management system is configured to perform various controls including protections operation based on various information, such as the voltage, temperature, and current of the secondary battery. The battery pack further includes a charging circuit. A voltage and current obtained by converting a voltage and current of a commercial power source into more appropriate values are input to charge the secondary battery (e.g., PTLs 1, 2).

The battery management system is implemented by e.g. a microcomputer and a charging field effect transistor (FET). If the microcomputer runs away, correct charging is performed, which may deteriorate safety. Therefore, although a method of duplicating microcomputers to perform a mutual check, or a method of performing charging by one of the microcomputers when the other is abnormal may be considered, for example, in order to correctly perform charging even if a microcomputer runs away, these methods In a problem that the configuration becomes complicated and the cost increases.

PTL 1 discloses a method in which a watchdog timer integrate circuit (IC) that monitors runaway of a microcomputer is provided in a battery pack connected with a charger, so that the operation state of the microcomputer is monitored based on a watchdog pulse output from the microcomputer at a constant period. When it is determined that the operation of the microcomputer is abnormal, a reset signal is output to the microcomputer and is also output to the charge permission, stop circuit, so that charging is forcibly stopped regardless of the content of the signal output from the microcomputer to the charge permission/stop circuit.

A general reset signal generated by a watchdog timer IC is for resetting the microcomputer by outputting a, low level for a certain period of time after the runaway of the microcomputer is detected, and then switching the level to a high level. For this reason, in a case where this signal is used both for resetting the microcomputer and forcibly stopping the charging by the charge permission/stop circuit, the forced stop of charging is canceled before the reset of the microcomputer is completed and the normal operation is performed, and the charging may be resumed even though the battery pack is in an abnormal state.

CITATION LIST

Patent Literature

PTL 1: Japanese Patent No. 5284672
PTL 2: Japanese Patent Laid-Open Publication No. 7-141066.

SUMMARY OF THE INVENTION

Technical Problem

An object of the present invention is to provide a battery pack and an abnormality monitoring method or the battery pack in which reliability is enhanced by preventing abnormal charging even it a microcomputer of a battery management system runs away.

Solution to Problem

A battery pack according to an exemplary embodiment is configured to charge a secondary battery The battery pack includes a charge switch connected in series with the secondary battery the charge switch being configured to adjust a charging current charging the secondary battery, a current detector configured to detect the charging current flow to the secondary battery, a drive circuit configured to drive the charge switch based on the charging current detected by the current detector a charge controller configured to control an operation of the charge switch by the drive circuit, a monitoring unit configured to monitor an operation of the charge controller, and a judging unit configured to instruct whether to operate the charge switch or not based on the charge controller and the monitoring unit. The charge controller is configured to generate a charge signal for charging the charge switch. The charge controller is configured to output a monitoring signal to the monitoring unit. The monitoring unit configured to monitor the monitoring signal and output a determination result of whether the monitoring signal is normal or abnormal as a determination signal. The judging unit is configured to instruct the charge switch to be able to or unable to charge the secondary battery based on the charge signal from the charging controller and the determination signal from the monitoring unit.

A method of charging a secondary battery according to another exemplary embodiment is for charging the battery by a battery pack which includes a charge switch connected in series with a secondary battery, a current detector configured to detect a charging current to the secondary battery, a drive circuit configured to drive the charge switch based on the charging current detected by the current detector, a charge controller configured to control operation of the charge switch by the drive circuit, a monitoring unit configured to monitor operation of the charge controller, and a judging unit configured to instruct the charge switch to be able to or unable to charge the secondary battery based on the charge controller and the monitoring unit. The method includes: outputting, by the charge controller, a monitoring signal to the monitoring unit; outputting, by the monitoring unit, a determination result of whether the monitor signal is normal or abnormal as a determination signal by monitoring, by the monitoring unit, the monitoring signal; and instructing, by the judging unit, the charge switch to be able to or unable to charge the secondary battery based on a charge signal from the charge controller and the determination signal from a monitoring unit.

According to the battery pack and the abnormality monitoring method for the battery pack according to an aspect of the present invention, whether to perform charging or not is determined on the basis of not only a charging signal from the charge controller but also a determination signal from the monitoring unit that monitors the charge controller, so that it is possible to reliably shut off the charge switch by the determination signal from the monitoring unit even if the charge controller continues to output the charge signal in a case where an abnormality occurs in the charge controller. Moreover, when the charge controller is restarted, it is confirmed that various abnormal states do not occur and then the charge signal is output, so that the reliability and safety in charging the battery pack are improved.

DESCRIPTION OF EMBODIMENT

A battery pack according to an aspect of the present invention may have the following configuration in addition to the above-described configuration.

According to a battery pack according to an exemplary embodiment of the present invention, the monitoring unit is configured to output the determination signal also to the charge controller. The charge controller is configured to reset the charge controller in a case where the determination signal is abnormal. This configuration allows the charge controller to be reset to eliminate the abnormal state when the monitoring unit detects an abnormality of the charge controller.

In a battery pack according to another exemplary embodiment of the present invention, the charge controller may be configured to perform a failure diagnosis While being able to stably output the monitoring signal after being reset by the determination signal, and to output the charge signal in a case where no abnormality is detected. Examples of the failure diagnosis include confirmation of a short-circuit failure of the charging FET, and continuation of an abnormality of the read-only memory (ROM) storing a program in the microcomputer. This configuration may perform a failure diagnosis in a stable state after the reset of the charge controller, and the charge signal is output after it is confirmed that various abnormalities of the battery pack do not occur, so that a more reliable failure diagnosis is expected.

In a battery pack according to another exemplary embodiment of the present invention, the determination signal may be a reset signal that is at a high level while the determination signal is normal and that is at a low level while the determination signal is abnormal, and the charge controller may be configured to reset the charge controller in a case where the reset signal is at the low level. This configuration allows the determination signal of the monitoring unit to be also used as the reset signal of the charge controller, and can be used for recovery when the charge controller is abnormal.

In a battery pack according to another exemplary embodiment of the present invention, the monitoring unit may be a watchdog timer integrated circuit (IC), and the monitoring sural may be a watchdog pulse. This configuration allows abnormality determination of the charge controller to be performed by the watchdog timer.

In a battery pack according to another embodiment of the present invention, the judging. unit may be configured to instruct the charge switch to be able to charge the secondary battery only when the charge signal of the charge controller is at a high level and the reset signal of the monitoring unit is at a high level. This configuration allows the determination to be performed not only by a charge signal from the charge controller but also by a determination signal from the monitoring unit configured of a separate member, so that it is possible to cope with the abnormality of the power reception controller, and the safety and reliability can be further improved.

In a battery pack according to another exemplary embodiment of the present invention, the judging unit is a NAND circuit.

A battery pack according to another exemplary embodiment of the present invention further includes a switcher connected between the charge switch and an output side of the judging unit, the switcher being configured to forcibly shut off a charging operation of the charge switch when the judging unit instructs the charge switch to be unable to charge the secondary battery A battery pack according to another exemplary embodiment of the present invention further includes a discharge switch connected in series with the secondary battery The discharge switch is configured to adjust a discharging current discharging the secondary battery The drive circuit is configured to drive the discharge switch based on the discharging current detected by the current detector The charge controller is configured to output a discharge signal for discharging the discharge switch to the discharge switch. The judging unit is configured to instruct the discharge switch to be able to or unable to discharge the secondary battery based on the charge signal from the charge controller and the determination signal from the monitoring unit. This configuration allows the battery pack to monitor the charge controller not only when the secondary battery is charged but also when the secondary battery is discharged to avoid a situation that the discharging current becomes abnormal at the time of abnormality, and can also enhance the safety during discharging.

In a charging method according to another exemplary embodiment of the present invention, the step of outputting the determination signal by the monitoring unit includes a step of outputting the determination signal to the charge controller The method further includes resetting, by the charge controller, the charge controller in a case where the determination signal is abnormal. As a result, when the monitoring unit detects an abnormality of the charge controller, the charge controller can be reset to eliminate the abnormal state.

A charging method according to another exemplary embodiment of the present invention further includes a step of performing, by the charge controller, a failure diagnosis while the charge controller is being able to stably outputting the monitoring signal subsequent to said resetting the charge controller, and outputting, by the charge controller, the charge signal in a case were no abnormality is detected As a result, since the Charge signal is output after it is confirmed that various abnormalities of the battery pack do not occur, a more reliable failure diagnosis is expected.

An exemplary embodiment of the present invention will be explained below with reference to the accompanying drawings. The exemplary embodiment described below exemplifies a battery pack that embodies a technical idea of the present invention, and the present invention is not limited to the battery pack described later. Moreover, in the present specification, members indicated in the claims are never specified to the members of the exemplary embodiments. In particular, the dimensions, materials, shapes, relative arrangements, and the like of the components described in the exemplary embodiment are not intended to limit the scope of the present invention exclusively unless otherwise specified, and are merely illustrative examples, Note that the sizes, positional relationships, or the like of members shown in the drawings may be exaggerated for clarity of description. In the following description, the same names and reference numerals indicate the same or similar members, and detailed description will be appropriately omitted. Furthermore, respective elements constituting the present invention may be configured such that the plurality of elements are constituted of the same members to form one member that functions as a plurality of elements, or conversely, the function of one member can be shared and achieved by a plurality of members.

A battery pack according to the present invention is mainly used as a power source for motive power. This battery pack is used as a power source for electrically powered devices driven by a motor, such as electric cleaners, electric tools, electric power-assisted bicycles, electric motorcycles, electric wheelchairs, electric tricycles, and electric carts. However, the present invention does not specify the use of the battery pack, and may be used as a power source, a motive power source for moving means, and an auxiliary power source for various electrical devices used indoors or outdoors in electrical devices, for example, wireless devices or lighting devices, other than electrically powered devices.

Exemplary Embodiment 1

Figure 1:
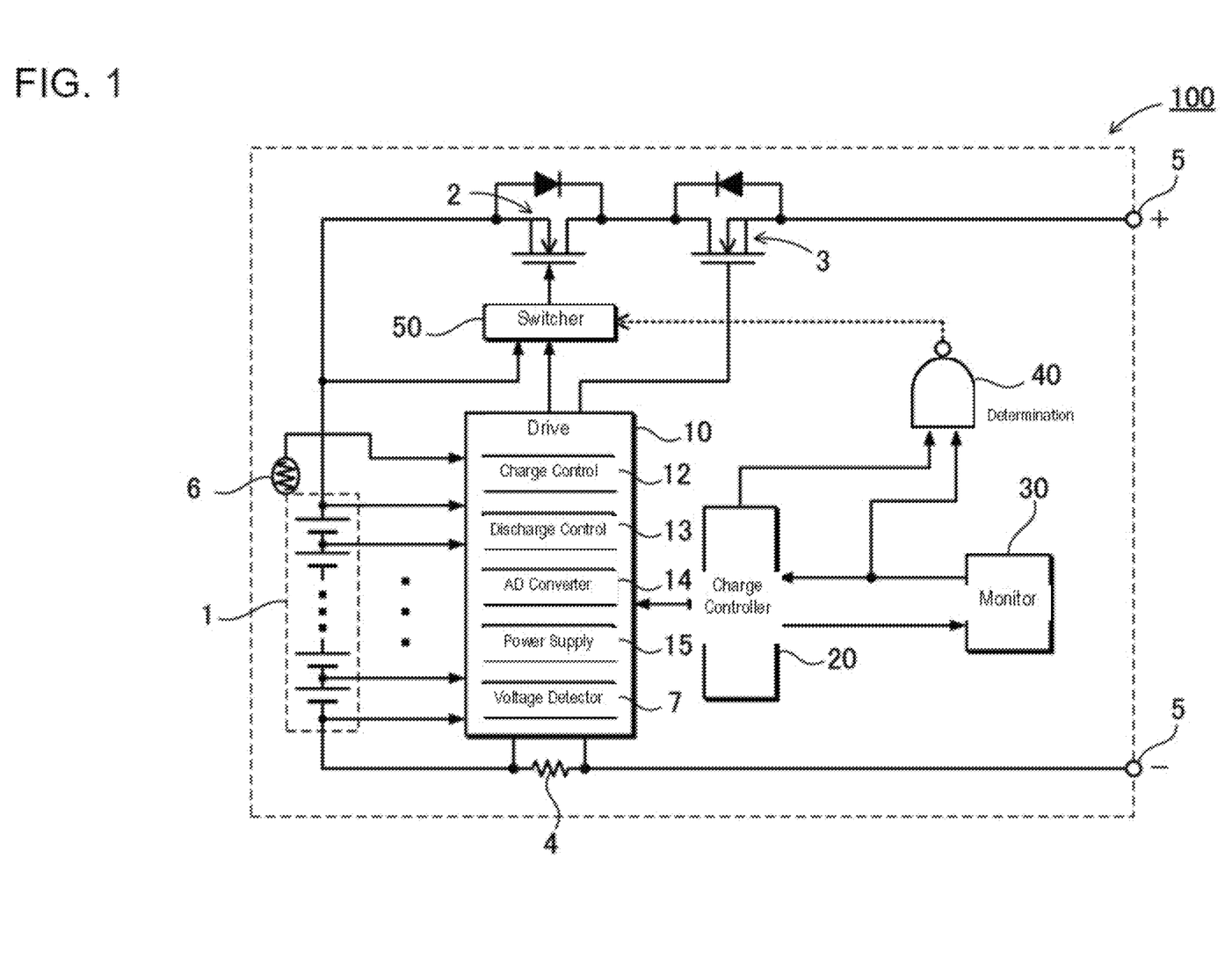
FIG. 1 is a block diagram of a battery pack according to an exemplary embodiment.

Battery pack 100 according to Exemplary Embodiment 1 of the present invention is illustrated in FIG. 1. Battery pack 100 illustrated in this figure includes secondary battery 1, charge switch 2, discharge switch 3, current detector 4, external terminal 5, temperature detector 6, voltage detector 7, drive circuit 10, charge controller 20, monitoring unit 30, judging unit 40, and switches 50. Charge switch 2, discharge switch 3, current detector 4 and external terminal 5 are connected in series with secondary battery 1

As secondary battery 1, a rechargeable battery, such as a lithium ion secondary battery, may typically utilized. A secondary battery, such as a nickel metal hydride battery or a nickel-cadmium battery, other than a lithium ion secondary battery may also be utilized. Secondary battery 1 has a large capacity and high output by being implemented by plural batteries connected in series or in parallel to one another. In addition to a cylindrical battery having a cylindrical outer shape, a prismatic battery or a flat battery having a rectangular outer shape may be used. Secondary battery 1 is not necessarily included in battery pack 100. For example, secondary batter 1 may be detachable from battery pack 100 or replaceable.

External terminal 5 is a connection terminal for receiving power for charging secondary battery 1 from the outside. External terminal 5 is connected with, for example, a charger or the like. In this case, a voltage and current obtained by converting a voltage and a current of a commercial power source into appropriate values are input through a charger connected with external terminal 5, and secondary battery 1 is charged through charge switch 2. In a case where battery pack 100 is incorporated in a device driven by secondary battery 1, the battery pack is connected with a power supply terminal in the driven device. In this case, the conversion of the voltage value or the current value may be appropriately omitted. The driven device driven by secondary battery 1 may be assisted bicycles, electric tools, electric cleaners, or electric scooters, driven by a battery.

Charge switch 2 is connected in series with secondary battery 1, and adjusts a charging current for charging secondary battery 1. Charge switch 2 may be implemented by, e.g. a charging FET.

Discharge switch 3 is also connected in series with secondary battery 1, and adjusts a discharging current for discharging secondary battery 1. Discharge switch 3 may be implemented by, e.g. a discharging FET.

Current detector 4 is connected in series with secondary battery 1, and detects a charge current and a discharging current to secondary battery 1. Current detector 4 may be typically implemented by a current detection resistor.

Voltage detector 7 detects the voltage of secondary battery 1. In the case, secondary battery 1 includes plural secondary batteries connected in series, voltage detector 7 may be configured to detect the voltage of each of the secondary batteries.

Temperature detector 6 detects the temperature of secondary battery 1. Temperature detector 6 may be implemented by, e.g. a thermistor. In the case that the plural secondary batteries are connected, temperature detector 6 may be configured to detect the temperature of each of the secondary batteries.

Drive Circuit 10

Outputs of current detector 4, temperature detector 6, and voltage detector 7 are connected with drive circuit 10. Drive circuit 10 acquires the charge and discharging currents detected by current detector 4, the temperature detected by temperature detector 6, and the voltage of each of the secondary batteries connected in series detected by voltage detector 7. Drive circuit 10 includes charge control circuit 12 configured to control operation of charge switch 2, discharge control circuit 13 configured to control operation of discharge switch 3, AD converter 14 configured to perform A/D conversion of the output of current detector 4, the voltage of voltage detector 7, and the temperature of temperature detector 6, and low-voltage power source circuit 15 configured to supply power for charge controller 20 and monitoring unit 30. After the detected charge/discharging current, temperature, and voltage of each battery are transmitted to charge controller 20 by communication or the like, ON/OFF control of charge switch 2 and discharge switch 3 is performed according to an instruction from charge controller 20.

Charge Controller 20

Figure 2:
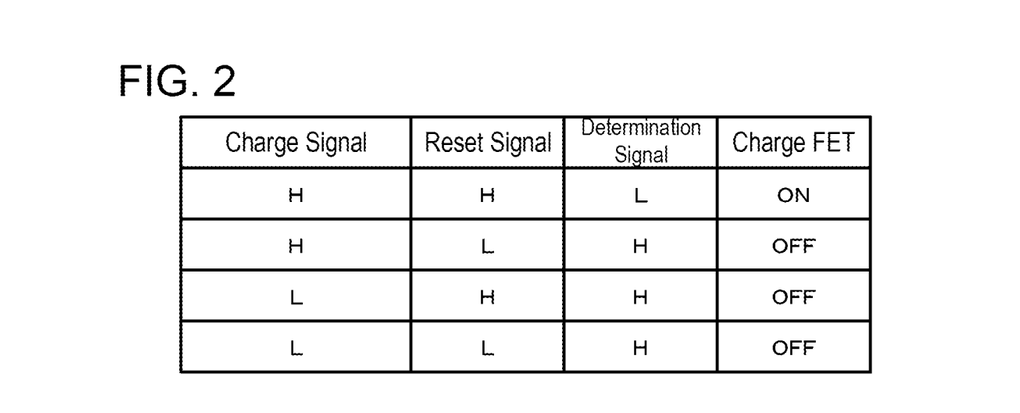
FIG. 2 is a table illustrating ON/OFF operation of a charge switch.

Charge controller 20 controls the operation of charge switch 2 by drive circuit 10. Moreover, charge controller 20 outputs a charge signal for charging charge switch 2. The charge signal is HIGH or LOW, and as illustrated in the table of FIG. 2, whether to charge charge switch 2 or not is determined in combination with the determination signal. As this charge controller 20, a programmable microcomputer or the like can be suitably utilized.

Figure 3:
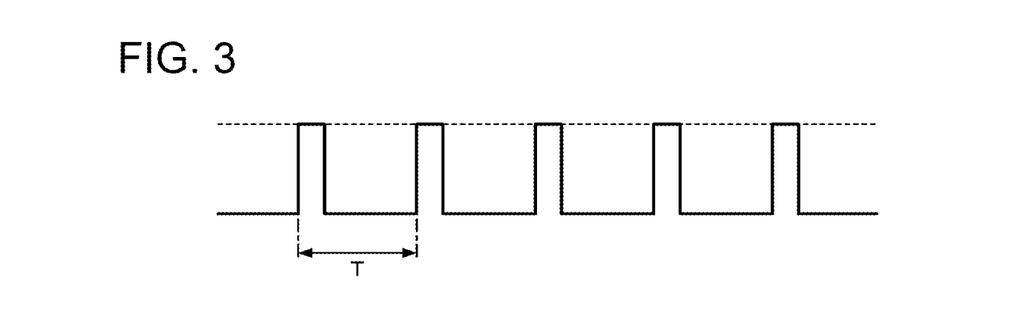
FIG. 3 illustrates an example of a watchdog pulse when a charge controller is in a normal state.
Figure 4A:
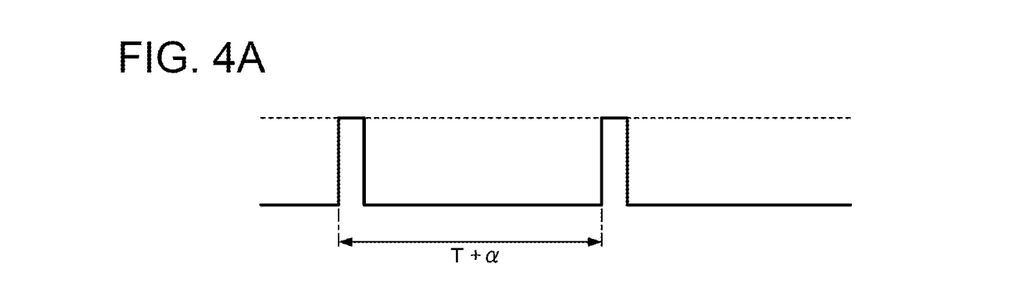
FIGS. 4A and 4B illustrate examples of the watchdog pulse when the charge controller is abnormal.
Figure 4B:
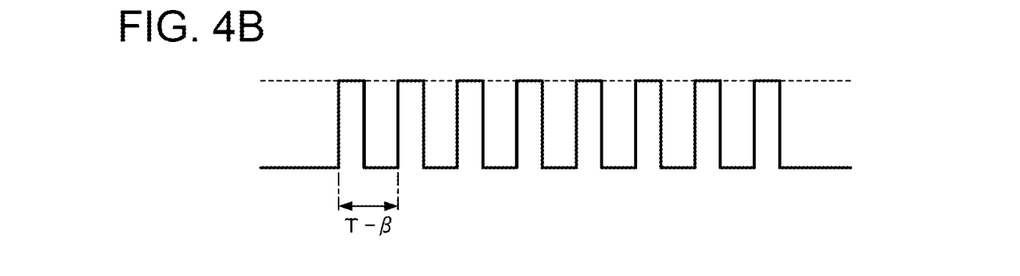

Furthermore, charge controller 20 outputs a monitoring signal to monitoring unit 30. The monitoring signal is, for example, a watchdog pulse. When the microcomputer of charge controller 20 is normal, the watchdog pulse is output at predetermined cycle T as illustrated in FIG. 3. On the other hand, when the microcomputer is abnormal, for example, the cycle becomes longer (T+α) as illustrated in FIG. 4A, or becomes shorter (T-β) as illustrated in FIG. 4B.

Monitoring Unit 30

Monitoring unit 30 monitors the monitoring signal, determines whether this monitoring signal is normal or abnormal, and outputs a determination result as the determination signal. Monitoring unit 30 is, for example, a watchdog timer IC that monitors a watchdog pulse, and determines whether the watchdog pulse is a normal watchdog pulse as illustrated in FIG. 3 or an abnormal watchdog pulse as illustrated in FIGS. 4A and 4B. In this manner, abnormality determination of charge controller 20 can be performed using the watchdog timer IC.

Judging Unit 40

Judging unit 40 instructs charge switch 2 to be able to or unable to operate bases on outputs from charge controller 20 and monitoring unit 30. Judging unit 40 is typically implemented by a NAND circuit. The determination circuit including the NAND circuit shown in FIG. 1 receives a charge signal from charge controller 20 and a determination signal from monitoring unit 30. When any of the input signals is at a low level, determination circuit outputs a signal of a high level to forcibly turn off charge switch 2.

Reset Signal

Monitoring unit 30 may also output the determination signal to charge controller 20. In this case, the determination signal may be a reset signal for resetting charge controller 20. In a case where the determination signal is abnormal, charge controller 20 resets charge controller 20. As a result, when monitoring unit 30 detects an abnormality of charge controller 20, charge controller 20 may be reset to eliminate the abnormal state. The determination signal of monitoring unit 30 may also be used as a reset signal of charge controller 20, and may be used for recovery when charge controller 20 is abnormal.

In the case that the determination signal is used as a reset signal, the determination signal may be at a high level in a normal case and be at a low level in an abnormal case. In this case, charge controller 20 resets charge controller 20 when the reset signal is at a low level.

As illustrated in FIG. 2, judging unit 40 may be configured to permit charging of charge switch 2 only when the charge signal of charge controller 20 is at a high level and the reset signal of monitoring unit 30 is at a high level. As a result, the determination is performed not only by a charge signal from charge controller 20 but also by a determination signal from monitoring unit 30 configured of a separate member, so that it is possible to cope with the abnormality of the charge controller, and the safety and reliability are further improved.

Charge controller 20 performs a failure diagnosis while the monitoring signal is able to stably output after the reset by the determination signal, and outputs the charge signal in a case where no abnormality is detected. As described above, since the charge signal is output after it is confirmed that various abnormalities of the battery pack do not occur, a more reliable failure diagnosis is expected. The failure diagnosis performed by charge controller 20 includes confirmation of the presence or absence of a short-circuit failure in charge switch 2 abnormality check of the ROM storing a program in the microcomputer, and the like.

Switcher 50

Switcher 50 is connected between charge switch 2 and an output side of judging unit 40. Switcher 50 forcibly shuts off the charging operation of charge switch 2 when judging unit 40 prohibits charging of charge switch 2.

Switcher 50 shown in FIG. 1 receives a. voltage Vbat of secondary battery 1, and the output from drive circuit 10. Switcher 50 switches between voltage Vbat and the output based on the determination output from judging unit 40. In the example of FIG. 1, when the determination output from judging unit 40 is at a low level, switcher 50 outputs the output from drive circuit 10 as it is. On the other hand, when the determination output from judging unit 40 is at a high level, the voltage Vbat is output. The voltage Vbat becomes a forcing OFF signal of the charging FET, so that charge switch 2 is forcibly turned off. In this manner, the charging operation by the charging FET may be turned off by means of hardware and to safely shut off the charging path until battery pack 100 resumes normal operation as described later.

Runaway Monitoring Function

In battery pack 100 in FIG. 1, it is possible to achieve safety of charging by detecting an abnormality of charge controller 20. In a conventional battery pack, if the program of the microcomputer constituting charge controller 20 runs away, there is a possibility that the charging cannot be stopped even when the charging voltage becomes high. In order to prevent this, although it is conceivable to provide another microcomputer to achieve duplication, the configuration becomes complicated and the cost increases in this method. Therefore, in the present embodiment, monitoring unit 30 that is cheaper and simpler reliably stops charging when an abnormality occurs in charge controller 20. In another conventional battery pack, the reset signal of this watchdog timer IC is switched from the low level to a high level signal before the microcomputer is normally started and the appropriate control or protection operation is started after the reset of the microcomputer occurs, so that the forced stop of the charge permission/stop circuit is canceled and the charging may be resumed regardless of the abnormal state. On the other hand, the NAND circuit output (judging unit) of the determination signal and the charge signal stabilizes the operation of the charge controller, and allows the operation of the battery pack to start after it is confirmed that various abnormalities do not occur.

An example of a procedure will be described with reference to timing charts of FIGS. 5A to 5E. As illustrated in FIG. 5C, the microcomputer of charge controller 20 operates according to a predetermined clock generated inside. Charge controller 20 outputs a monitoring signal to monitoring unit 30. The monitoring signal may be a watchdog pulse as described above. When the microcomputer of charge controller 20 is normal, the watchdog. pulse is output at predetermined period T as illustrated in FIG. 3. On the other hand, when the microcomputer is abnormal, for example, the period becomes longer $(T+\alpha)$ as illustrated in FIG. 4A, or becomes shorter $(T-\beta)$ as illustrated in FIG. 4B. Monitoring unit 30 is a watchdog timer IC (WDTIC) configured to monitor a watchdog pulse that is the monitoring signal. The WDTIC determines whether this monitoring signal is normal or abnormal, and outputs a determination result as a determination signal. That is, it is determined whether the watchdog pulse is a normal watchdog pulse as illustrated in FIG. 3 or an abnormal watchdog pulse as illustrated in FIG. 4A or 4B. Then, judging unit 40 instructs charge switch 2 to be able to or unable to charge the secondary battery based on a charge signal from charge controller 20 and the determination signal from monitoring unit 30.

Figure 5A:
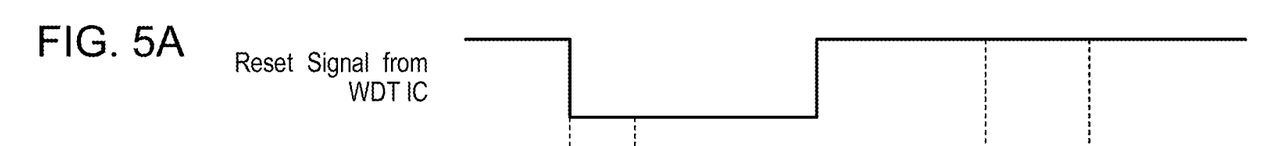
FIG. 5A is a timing chart illustrating a reset signal from a monitoring unit.
Figure 5B:
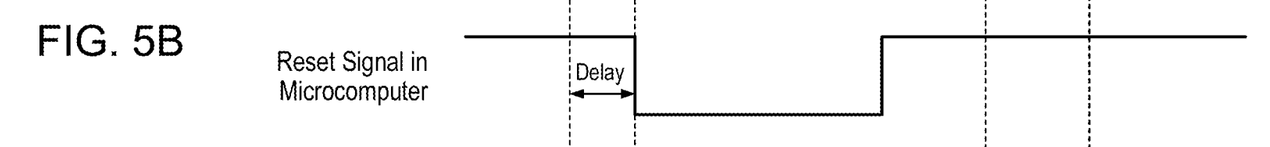
FIG. 5B is a timing chart illustrating a reset signal in the charge controller.
Figures 5C, 5D:
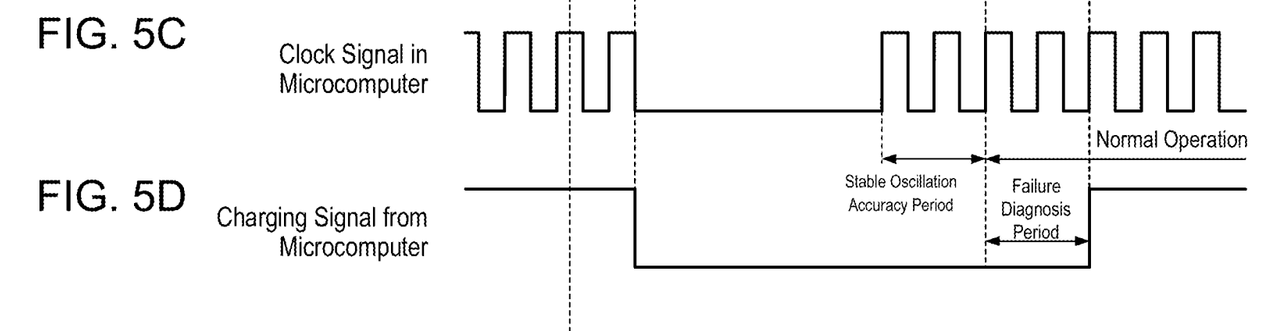
FIG. 5C is a timing chart illustrating clock operation in the charge controller.
FIG. 5D is a timing chart illustrating a charge signal from the charge controller.

It is assumed that monitoring unit 30 (WDTIC) detects runaway of the program of the microcomputer, that is, charge controller 20, and outputs a reset signal, as illustrated in FIG. 5A. That is, it is assumed that the reset signal that is the determination signal changes from the high level in a normal state to a low level. In response to this, charge controller 20 resets, that is, restarts the microcomputer in accordance with the reset signal. As illustrated in FIG. 5B, the reset signal changes from a high level in a normal state to a low level with a small delay. Accordingly as illustrated in FIG. 5C, the clock signal of the microcomputer periodically generated in a normal state disappears. Similarly the charge signal supplied from the microcomputer is switched from a high level in a normal state, that is, charging permission to a low level, that is, charging prohibition. On the other hand, in response to the change from the high level to the low level of the reset signal in FIG. 5A, the charging FET that is charge switch 2 is prohibited from charging the battery, that is, turned off as illustrated in the second row in FIG. 2. As described above, charging is immediately stopped upon receiving the determination result of monitoring unit 30 without waiting for the shut off of the charge signal, and the reaction speed is further increased to enhance the safety, while charging is conventionally prohibited upon receiving the cut off of the charge signal of the microcomputer (FIG. 5D).

Figure 5E:
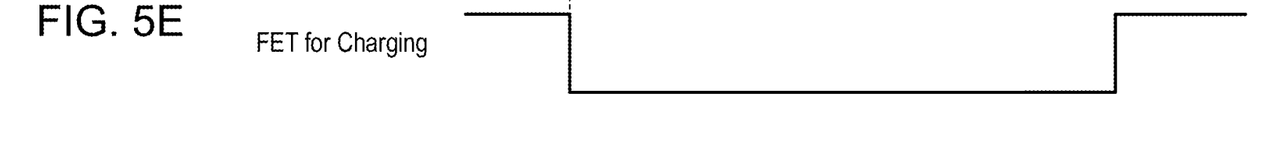
FIG. 5E is a timing chart illustrating operation of the charge switch.

Next, the reset is canceled after a predetermined period elapses, and the reset signal returns from a low level in an abnormal state to a high level in a normal state as illustrated in FIG. 5A. On the other hand, the reset microcomputer is restarted after a predetermined time elapses, the reset signal in the microcomputer changes from a low level in an abnormal state to a high level in a normal state again, as illustrated in FIG. 5B. Similarly, the clock operation in the microcomputer is also resumed as illustrated in FIG. 5C. On the other hand, before resuming the charge signal from the microcomputer, the failure diagnosis is performed after the stability period of the oscillation accuracy. As described above, the short-circuit failure determination of the charging FET, the check of the ROM in the microcomputer, and the like are performed. When there is no failure, the charge sural is changed from a low level in an abnormal sate to a high level in a normal state, as illustrated in FIG. 5D. In response to this, judging unit 40 that is a NAND circuit switches the determination output from a high level in an abnormal state to a low level in a normal state when the charge permission signal (FIG. 5D) and the determination signal (FIG. 5A) illustrated in the first row in FIG. 2 are both at the high level. As illustrated in FIG. 5E, the charging FET is turned on to start charging. In this manner, the operation of the microcomputer after the reset is stabilized. Them when it is determined that there is no failure, the charging of secondary battery 1 is resumed. Moreover, since the charging is resumed immediately after the microcomputer is restarted in a conventional configuration without monitoring unit 30 or judging unit 40, the safety in a case where a failure occurs is not secured, while the operation of the microcomputer is stabilized. The charging FET is turned on after a failure diagnosis is obtained in battery pack 100 of secondary battery 1 according to the present embodiment as described above, so that further safety is secured.

As described above, it is determined whether to perform charging or not based on not only a charge signal from charge controller 20 but also a determination signal from monitoring unit 30 that monitors charge controller 20. This operation allows charge switch 2 to be reliably shut off by a determination signal from monitoring unit 30 even if an abnormality occurs in charge control unit 20 and charge controller 20 continues to output the charge signal, and the reliability and safety of charging of secondary battery 1 are improved. When program runaway occurs in the microcomputer, the charging path may be reliably shut off until the operation of the power supply device is resumed.

In particular, safety is also secured in a period frons cancellation of the reset by the watchdog tinier IC to start of stable operation of the microcomputer. Moreover, the presence or absence of the occurrence of a failure in battery pack 100 is diagnosed before the resumption of the operation, so that the safety can be further enhanced. On the contrary, in a conventional battery pack, Since the Shutoff of the charging path is canceled at the same time as the reset cancellation, a problem may occur due to the charging if there is a failure. On the other hand, a battery pack and a battery pack can be used more safely by considering the safety after the microcomputer is reset.

In the above example, the method of controlling the operation of charge switch 2 during charging and discharging, secondary battery 1 has been described above. However, the present invention is not limited to the configuration in which the secondary battery is monitored during charging and the secondary battery may be monitored during charging and discharging. In particular, since a safety measure is required in case where an abnormality of secondary battery 1 occurs during charging as compared with during discharging, the abnormality monitoring function of the secondary battery of the present invention is suitably exhibited. In a battery pack that monitors charging and discharging of a secondary battery, a charge/discharge controller may be used instead of the charge controller. It is clear that the charge controller may have a function of controlling the discharging current regardless of the name.

INDUSTRIAL APPLICABILITY

A battery pack and an abnormality monitoring method for the battery pack according to the present invention can be suitably applied to a battery pack that drives electric tools, electric power-assisted bicycles, electric motorcycles, electric tricycles, electric wheelchairs, electric carts, electric cleaners, electric blowers, and the like, for example, a battery management system incorporated in these devices, a charger prepared as a separate member, or the like. Moreover, the present invention can also be applied as a power source, a motive power source for moving means, and an auxiliary power source for various electric devices used indoors or outdoors in electrical devices, for example, wireless devices or lighting devices, other than electrically powered devices driven by a motor.

REFERENCE MARKS IN THE DRAWINGS 100 battery pack
1 secondary battery
2 charge switch
3 discharge switch
4 current detector
external terminal
6 temperature detector
7 voltage detector
drive circuit
12 charge controlling circuit
13 discharge controlling circuit
14 AD converter
power source circuit
charge controller
30 monitoring unit
40 judging unit
50 switcher

The invention claimed is:

1. A battery pack configured to charge a secondary battery, the battery pack comprising:
a charge switch connected in series with the secondary battery, the charge switch being configured to adjust a charging current charging the secondary battery;
a current detector configured to detect the charging current flow to the secondary battery;
a drive circuit configured to drive the charge switch based on the charging current detected by the current detector;
a charge controller configured to control an operation of the charge switch by the drive circuit;
a monitoring unit configured to monitor an operation of the charge controller; and
a judging unit configured to instruct whether to operate the charge switch or not based on the charge controller and the monitoring unit, wherein
the charge controller is configured to generate a charge signal for the charge switch,
the charge controller is configured to output a monitoring signal to the monitoring unit,
the monitoring unit configured to monitor the monitoring signal and output a determination result of whether the monitoring signal is normal or abnormal as a determination signal, and
the judging unit is configured to instruct the charge switch to be able to or unable to charge the secondary battery based on the charge signal from the charging controller and the determination signal from the monitoring unit;
wherein, during charging the secondary battery, in response to the monitoring unit detecting that the monitoring signal from the charge controller is abnormal, the monitoring unit outputs the determination signal as a reset signal output to the charge controller for resetting the charge controller, and the determination signal is also output to the judging unit to instruct the charge switch to stop charging the secondary battery for controlling the charge signal.

2. The battery pack according to claim 1, wherein the charge controller is configured to:
perform a failure diagnosis while being able to stably output the monitoring signal after being reset by the determination signal; and
output the charge signal in a case where no abnormality is detected.

3. The battery pack according to claim 1, wherein the judging unit comprises a NAND circuit.

4. The battery pack according to claim 1, further comprising a switcher connected between the charge switch and an output side of the judging unit, the switcher being configured to forcibly shut off a charging operation of the charge switch when the judging unit instructs the charge switch to be unable to charge the secondary battery.

5. The battery pack according to claim 1, further comprising
a discharge switch connected in series with the secondary battery, the discharge switch being configured to adjust a discharging current discharging the secondary battery, wherein
the drive circuit is configured to drive the discharge switch based on the discharging current detected by the current detector,
the charge controller is configured to output a discharge signal for discharging the secondary battery to the discharge switch, and
the judging unit is configured to instruct the discharge switch to be able to or unable to discharge the secondary battery based on the charge signal from the charge controller and the determination signal from the monitoring unit.

6. The battery pack according to claim 1, further comprising:
a voltage detector configured to detect a voltage of the secondary battery; and
a temperature detector configured to detect a temperature of the secondary battery, wherein
the drive circuit is configured to output the charging current detected by the current detector, the voltage detected by the voltage detector, and the temperature of the secondary battery detected by the temperature detector to the charge controller so as to drive the charge switch.

7. The battery pack according to claim 1, wherein
the determination signal is the reset signal that is at a high level in response to the monitoring unit detecting that the monitoring signal from the charge controller is normal and that is at a low level in response to the monitoring unit detecting that the monitoring signal from the charge controller is abnormal, and
the charge controller is configured to perform a self-reset in a case where the reset signal is at the low level.

8. The battery pack according to claim 7, wherein
the monitoring unit comprises a watchdog timer integrated circuit (IC), and the monitoring signal comprises a watchdog pulse.

9. The battery pack according to claim 8, wherein the judging unit is configured to instruct the charge switch to be able to charge the secondary battery only when the charge signal of the charge controller is at a high level and the reset signal of the monitoring unit is at a high level.

10. A method of monitoring abnormality of a battery pack which includes:
a charge switch connected in series with a secondary battery,
a current detector configured to detect a charging current to the secondary battery,
a drive circuit configured to drive the charge switch based on the charging current detected by the current detector,
a charge controller configured to control operation of the charge switch by the drive circuit,
a monitoring unit configured to monitor operation of the charge controller, and
a judging unit configured to instruct the charge switch to be able to or unable to charge the secondary battery based on the charge controller and the monitoring unit,
the method comprising:
outputting, by the charge controller, a monitoring signal to the monitoring unit;
outputting, by the monitoring unit, a determination result of whether the monitoring signal is normal or abnormal as a determination signal by monitoring, by the monitoring unit, the monitoring signal; and
instructing, by the judging unit, the charge switch to be able to or unable to charge the secondary battery based on a charge signal from the charge controller and the determination signal from a monitoring unit;
wherein, during charging the secondary battery, in response to the monitoring unit detecting that the monitoring signal from the charge controller is abnormal, the monitoring unit outputs the determination signal as a reset signal output to the charge controller for resetting the charge controller, and the determination signal is also output to the judging unit to instruct the charge switch to stop charging the secondary battery for controlling the charge signal.

11. The method according to claim 10, further comprising performing, by the charge controller, a failure diagnosis while the charge controller is being able to stably outputting the monitoring signal subsequent to said resetting the charge controller, and outputting, by the charge controller, the charge signal in a case where no abnormality is detected.

* * * * *